United States Patent [19]
Khan et al.

[11] Patent Number: 5,892,941
[45] Date of Patent: Apr. 6, 1999

[54] MULTIPLE USER SOFTWARE DEBUGGING SYSTEM

[75] Inventors: Azeemullah Khan, Redmond; Glenn T. Noyama, Kirkland; Andrew Michael Pennell, Redmond, all of Wash.

[73] Assignee: Microsoft Corporation, Redmond, Wash.

[21] Appl. No.: 841,615

[22] Filed: Apr. 29, 1997

[51] Int. Cl.⁶ .................................................. G06F 17/00
[52] U.S. Cl. ............................................................. 395/500
[58] Field of Search ..................................... 395/568, 500, 395/704

[56] References Cited

U.S. PATENT DOCUMENTS

| | | | |
|---|---|---|---|
| 4,231,087 | 10/1980 | Hunsbergewr et al. | 395/183.01 |
| 5,113,523 | 5/1992 | Colley et al. | 395/800 |
| 5,450,586 | 9/1995 | Kuzara et al. | 395/700 |
| 5,473,754 | 12/1995 | Folwell et al. | 395/183.21 |
| 5,557,539 | 9/1996 | Fitch | 364/514 B |
| 5,612,898 | 3/1997 | Huckins | 364/514 R |
| 5,615,332 | 3/1997 | Yamamoto | 395/183.14 |
| 5,652,869 | 7/1997 | Herdeg et al. | 395/500 |

*Primary Examiner*—David Y. Eng
*Attorney, Agent, or Firm*—Duft, Graziano & Forest, P.C.

[57] ABSTRACT

A minimally intrusive debugging system for use by multiple users for concurrently and independently debugging a common software target in a client and server debugging environment. The target software is a non-compiled interpreted script-type program that is individually controlled by independent client debugging sessions. Each debug engine in the client's debugging session is used to control the target software program using debug system library interface calls that are integrated into the executing target software program. The debug system library interface calls facilitate communication of target system program events to the client's debug engine and to extract internal operational information from said target software program by the client debug engine and target software program interface on each client computing device.

18 Claims, 5 Drawing Sheets

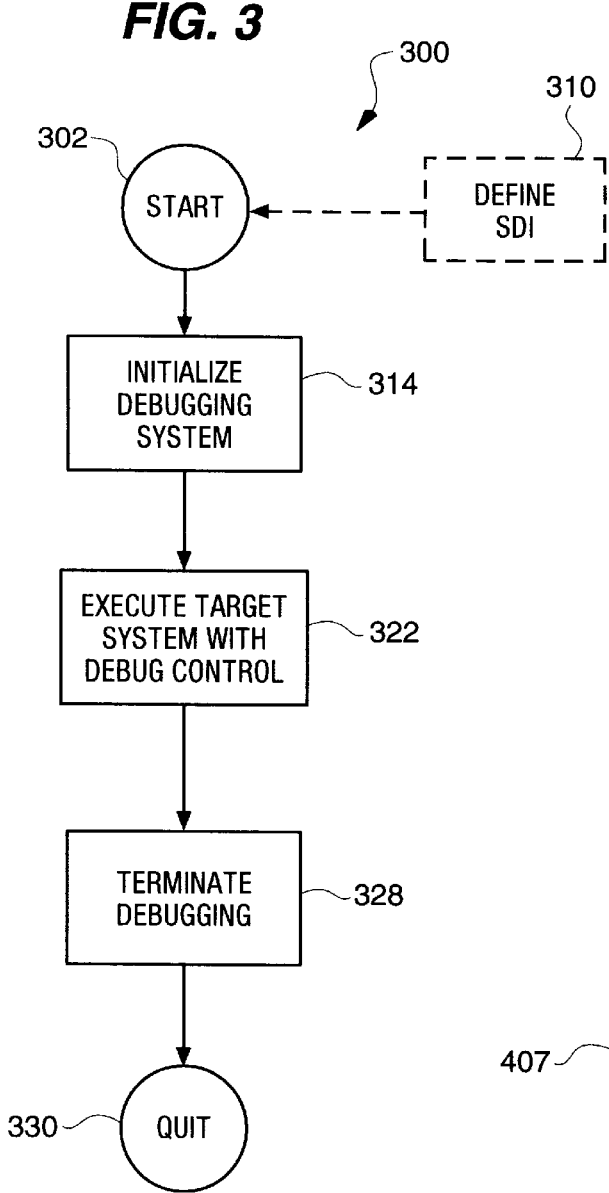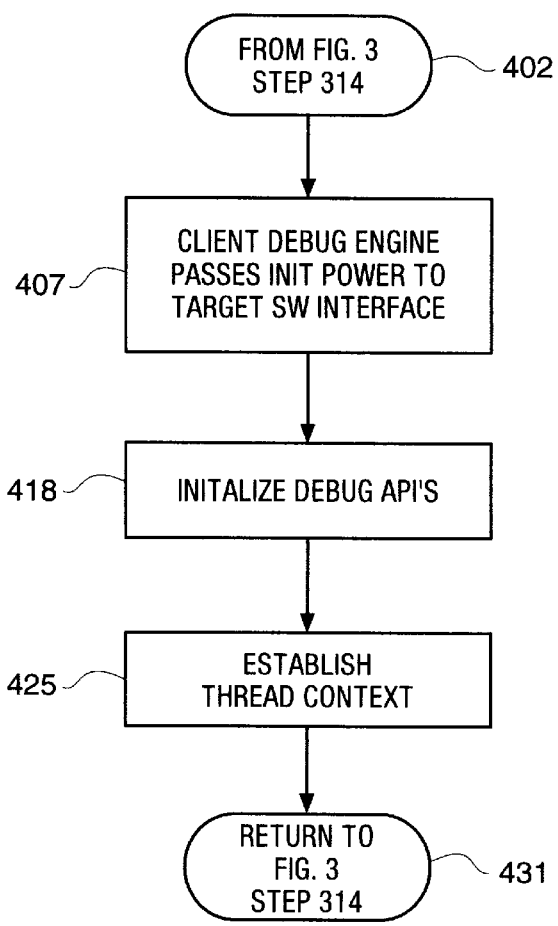

ness of the existing debug tools. Even if 35
MULTIPLE USER SOFTWARE DEBUGGING SYSTEM

FIELD OF THE INVENTION

This invention relates to the field of software debugging systems and in particular to a system for multiple users to independently and simultaneously debug a common server based software target.

PROBLEM

Existing software debugging techniques are readily available for single user debugging of a single target software system. The typical debugging tool is a static debug tool that requires exclusive control of the target software being debugged. Single user debugging means that only one user can have active debugging access to the target software at a time. A static debug tool is one that facilitates either controlled stepwise execution of individual program instructions and/or periodic breakpoint execution of target software sections. Using either the stepwise or periodic breakpoint debugging technique, normal execution of the target software is frozen at prescribed execution intervals to allow user inspection of the target system's internal data including, but not limited to, memory locations, registers, and/or instruction address sequences. The user debugging the target software determines whether the target software is operating as expected by inspecting the memory and registers of the halted target software. Such a debugging technique presents a variety of difficulties for multiple users simultaneously debugging a common software target.

For example, one key problem is that single user debugging techniques are limiting in that only one user can uninterruptedly debug the target software at a time due to the highly intrusive nature of the existing debug tools. Even if the user debugging a target software is only debugging one small object of the target software, processing for the entire target software is halted when a prescribed execution interval or breakpoint is reached. The target software does not resume executing subsequent instructions until the controlling user manually releases the target software. Multiple users can only be afforded an uninterruptible debugging environment if the target software is duplicated on an independent debugging environment for each one of the multiple users.

For the above reasons a multiple user debugging tool is desirable that allows multiple user access to simultaneously and uninterruptedly debug a common software target. A multiple user debugging tool of this type has heretofore not been realized prior to the present disclosure.

SUMMARY

The above identified problems are solved and a technical advance achieved in the field by the multiple user software debugging system of the present invention. The multiple user software debugging system facilitates a minimally intrusive debugging environment, preferably a client and server computing environment, that controls execution of target software by participating as part of the actual target software system activity concurrently with, but without directly affecting, other of the multiple users of the same target software. The multiple user software debugging system comprises integrating at least one of a plurality of debug interface calls into the target software itself. The target software is a server based computer program. Additional steps include loading a debug interface library containing a plurality of debug interfaces for use by the target software and the debug engine, wherein at least one of the plurality of debug interfaces is loaded as an operational component of the target software. A final step includes executing the target software under minimally intrusive control of the debug engine by way of the debug interfaces in a concurrent manner for each of the multiple users.

The debugging system establishes at least one thread connection for communication between said target software and said debug engine. The thread is used during target software execution by calling at least one of the plurality of debug interfaces from the target software for each executable target software statement to notify the debug engine of target software events, and retrieving internal target software operating information by said debug engine. The debug interfaces available to the target software and the debug engines include, but are not limited to, an initialization interface, an execution interface, a symbol handling interface, an error handling and termination interface, and a resource management interface.

BRIEF DESCRIPTION OF THE DRAWINGS

FIG. 3 illustrates an overview of the multiple user debugging system operational steps in flow diagram form;

FIG. 4 illustrates initialization steps in flow diagram form;

DETAILED DESCRIPTION

Figure 1:
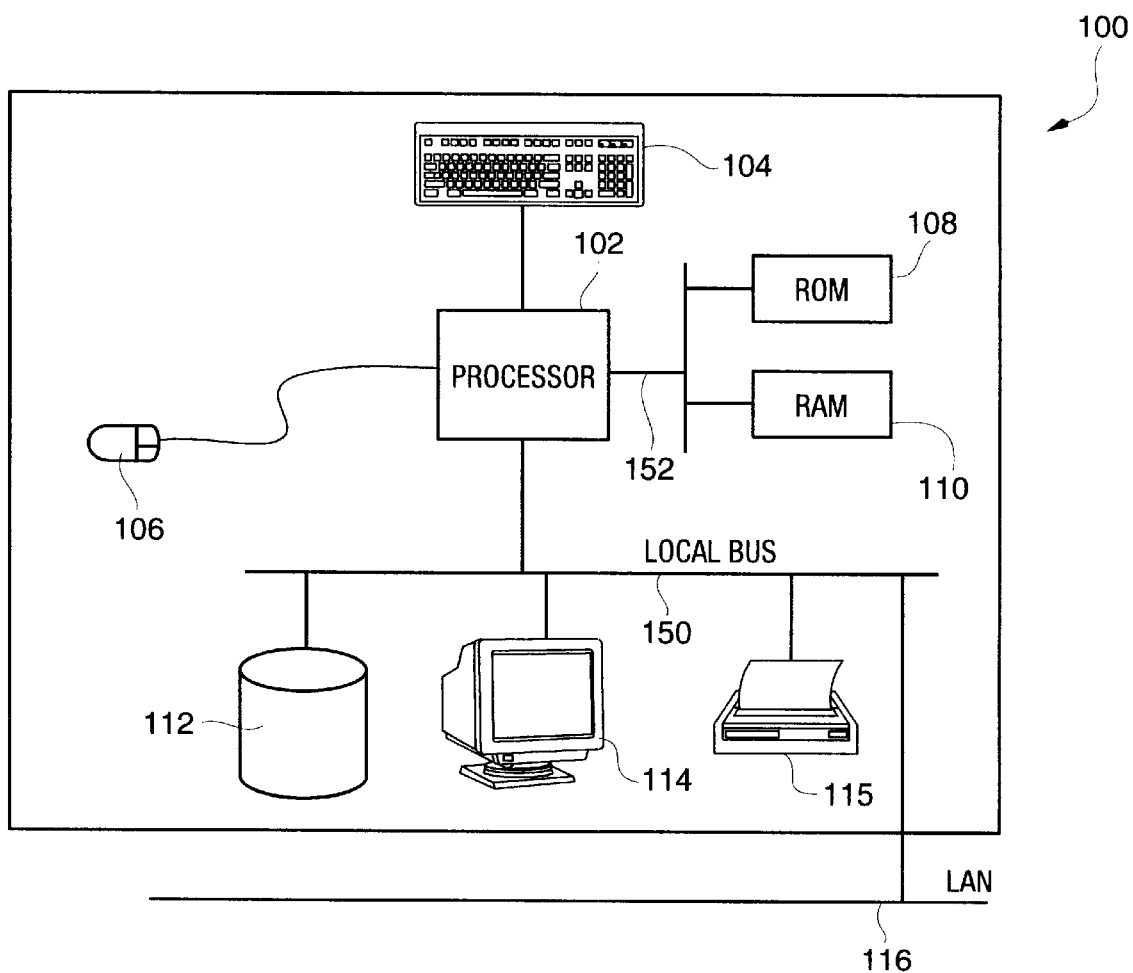
FIG. 1 illustrates a typical computing and debugging environment in block diagram form used by multiple users.

Multiple User Computing Environment - FIG. 1

FIG. 1 illustrates a block diagram example of a computer system 100 in a multiple user debugging environment. The multiple user debugging system of the present invention is operable in any of several standard computing systems readily available in the industry such as computer system 100. The target software, the debugging system, and any other programmed instructions and/or commands for the debugging system are executable on processor 102. Processor 102 stores and/or retrieves programmed instructions and/or data from memory devices that include, but are not limited to, Random Access Memory (RAM) 110 and Read Only Memory (ROM) 108 by way of memory bus 152. Another accessible memory device includes non-volatile memory device 112 by way of local bus 150. User input to computer system 100 is entered by way of keyboard 104 and/or pointing device 106. Human readable output from computer system 100 is viewed on display 114 or in printed form on local printer 115. Alternatively, computer system 100 is accessible by remote users for debugging, input, and/or generating human readable displays in printed and/or display screen output form or any other output form by way of Local Area Network (LAN) 116.

Figure 2:
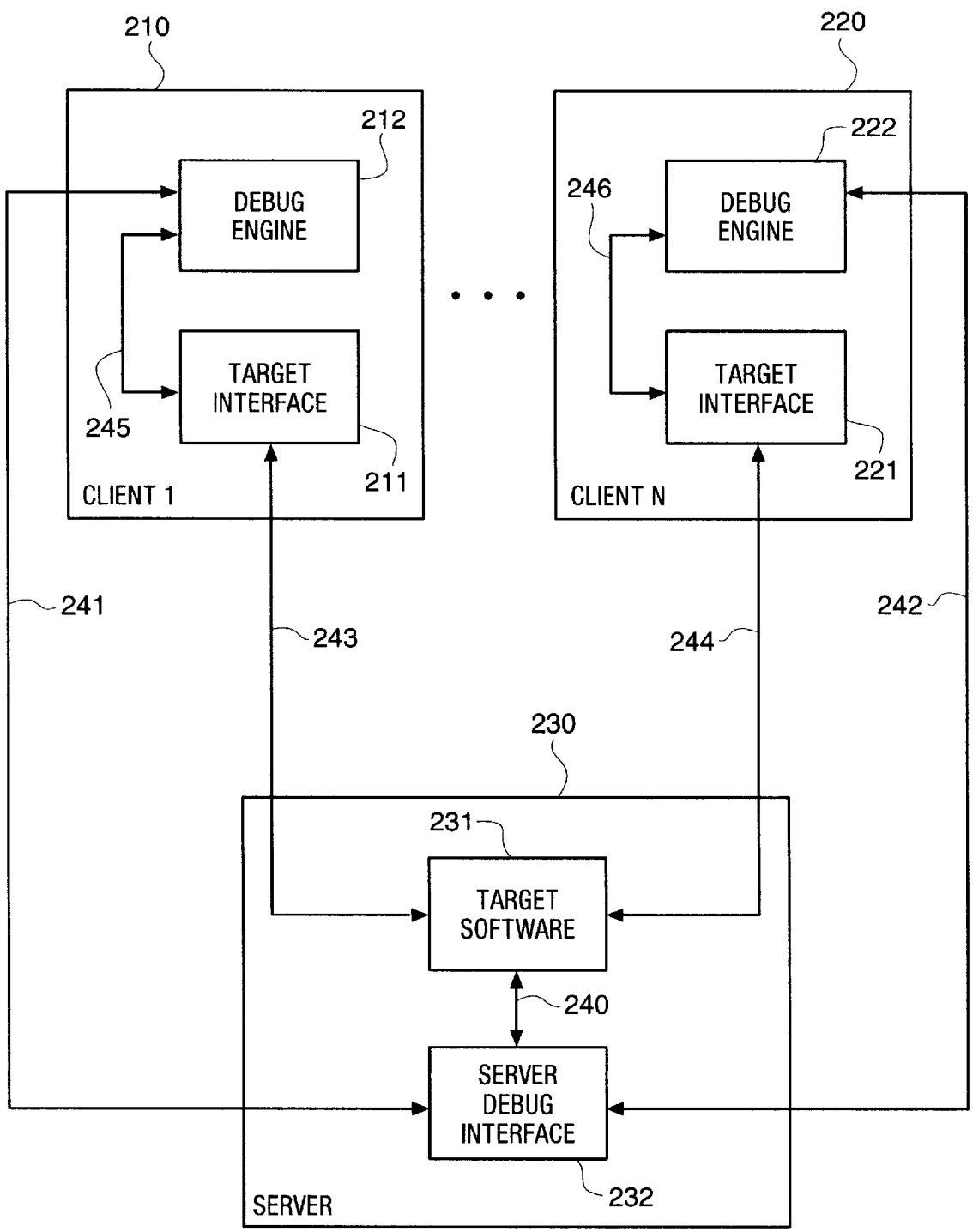
FIG. 2 illustrates process configuration in block diagram form for a multiple user debugging environment.

Process Configuration - FIG. 2

FIG. 2 illustrates a process configuration for the multiple user debugging system 200 having client processes 210 and 220, and server process 230. Client processes 210 and 220 respectively include, but are not limited to, a target interface 211 and 221, and a debug engine 212 and 222. Server process 230 includes, but is not limited to, a target software process 231 and a Server Debug Interface (SDI) 232.

The SDI 232 is operatively connected to the target software process 231 by communication path 240, and to each debug engine 212 and 222 by communication paths 241 and 242 respectively. Each debug engine 212 and 222 is operatively connected to the respective target interfaces 211 and 221 by communication paths 245 and 246 respectively. The target interfaces 211 and 221 on clients 210 and 220 are operatively connected to the target software 231 on server 230 by communication paths 243 and 244 respectively.

The debug interface 232 interacts with the target software 231 to notify client debug engines 212 and 222 of processing events on the target system 231, and to provide a way for each client's debug engine 212 or 222 to control the execution flow of the server target engine 231 as needed. The server's debug interface 232 is also used to exchange symbol table information between the target software 231 and each client's debug engine 212 and/or 222 to facilitate internal data inspection by way of each client's debug engine 212 or 222.

Debugging System Operational Steps - FIG. 3

FIG. 3 illustrates an overview of the debugging system operational steps 300 in flow diagram form. The debugging system begins at step 302 and is preceded at least once by a debug system interface definition phase at step 310. An example detailing a set of debug system interface definitions from step 310 are disclosed in the text below accompanying FIG. 3 step 310.

At step 314 the multiple user debugging system is initialized for operational use. Details of the debugging system initialization at step 314 are disclosed in the text accompanying FIG. 4. Operational debugging occurs at step 322 by executing the target software under the control of the debugging system. Details of the operational debugging process at step 322 are disclosed in the text accompanying FIG. 5. Terminating the debugging system for an individual one of the multiple users debugging the target software occurs at step 328, and debug processing is complete at step 330. Details of debugging system termination at step 324 are disclosed in the text accompanying FIG. 6.

Debugging System Interface Definitions

The examples below illustrate sample debugging system interface definitions as are generated at FIG. 3 step 310. Debugging system interface definitions include interface definitions for the Server Debug Interface (SDI) 232, and the Application Program Interfaces (API) 211 and 221 for use by individual clients 210 and 220 to communicate with the target software 231.

The SDI interface 232 is a Dynamic-Link Library (DLL) and set of callbacks that are loaded at debug system initialization time at step 314, and then called by the target software 231 at the time each instruction of the target software 231 is executed. The callbacks comprise a set of functions that are implemented by the target software 231 to be used by the SDI 232 for purposes that include, but are not limited to, inspection and modification of symbolic information.

The specific data structures and data types defined in the DLL are unique to the target software yet accommodate the informational needs of the debug system. Each data structure in the DLL can be customized subject to the architecture of the target software being debugged and the flexibility of the language upon which the target software is based. An example of the data structures and data types for a Structure Query Language (SQL) server application includes, but is not limited to, the definitions listed below.

Global Variables

1) ULONG INTV - where INTV is the INTerface Version of the SDI interface 232. The INTV can include or consist of a date and time-of-day data. The INTV can be used by the initialization routine to verify compatibility between SDI 232 and the target software 231.

2) ULONG IMPV - where IMPV is the IMPlementation Version of the SDI interface 232. The IMPV can include or consist of alpha and/or numeric version identification data. The IMPV can be used by the initialization routine to identify and/or verify what set of client API interfaces the SDI interface 232 supports.

3) ULONG SPID - where SPID is the Stored Procedure IDentification number for a unique connection ID that is the number assigned to every connection to target software 231 made by target interfaces 211 and 221. At any given instance in time there can never be two connections with the same identification number.

4) ULONG PRID - where PRID is the unique PRocedure IDentification number for a stored procedure of the debugging system.

5) ULONG IDX - where IDX is a numeric InDeX to the next target software program instruction or Stored Procedure program instruction in queue for execution by the host processor 102. The IDX is 1 for a Stored Procedure statement that is the first line. For a batch, which is a set of SQL statements submitted together and executed as a group, it is 0.

6) USHORT NLVL - where NLVL is the present Nesting LeVeL of the next server target application program instruction queued for execution by the host processor 102.

7) struct_SQLFNTBL SQLFNTBL - where SQLFNTBL is the SQL Function TaBLe data structure that defines the list of addresses of callback functions supported by the present version of target software 231 which may be called by the SDI 232. An example of the SQLFNTBL data structure can include:

```
typedef struct_SQLFNTBL {
    pfnSDIGetLastError    SDIGetLastError;    // Get the last Server error
    pfnSDIGetSym          SDIGetSym;          // Get a specified symbol category
    pfnSDISetSym          SDISetSym;          // Set the value of a set of symbols
    pfnSDIDbgOff          SDIDbgOff;          // Turn SQL Debug mode off
}SQLFNTBL, *PSQLFNTBL;
```

8) struct_DBGFNTBL DBGFNTBL - where DBGFNTBL is the Global FunctioN TaBLe data structure that defines the list of addresses of callable functions supported by the present version of the SDI 232. The SDI 232 provides the DBGFNTBL data structure to the target software 231 at initialization time. An example of the DBGFNTBL data structure for an SQL target application can include:

```
typedef struct_DBGFNTBL {                               // function table filled in by debug DLL
pfnSDINewConnection       SDINewConnection;             // Notify new connection
pfnSDINewSP               SDINewSP;                     // Notify load of new SP
```

-continued

```
pfnSDIStep              SDIstep;             // Notify of new statement execution
pfnSDINewBatch          SDINewBatch;         // Notify of batch cmd loaded
pfnSDIPvAlloc           SDIPvAlloc;          // Resource - allocate memory
pfnSDIPvAllocZ          SDIPvAllocZ;         // Resource - allocate 0 fitted
pfnSDIPvRealloc         SDIPvRealloc;        // Resource - reallocate
pfnSDIFreePv            SDIFreePv;           // Resource - free resource
pfnSDIPop               SDIPop;              // Pop level of execution-stack walking.
PfnSDICloseConnection   SDICloseConnection;  // Connection close cleanup resources.
PfnSDISpidContext       SDISpidContext;      // Notify client thread context.
}DBGFNTBL, *PDBGFNTBL;
 9) struct_SYMINFO SYMINFO - where SYMINFO is the SYMbol INFOrmation
      data structure used by 232 to retrieve symbol table information from the
      target software 231. The SYMINFO data structure definition can include:
typedef struct_SYMINFO {
      SYM_TYPE    st;          // symbol type
      void        *pv;         // pointer to symbol value
      USHORT      cb;          // length
      USHORT      cbName;      // length of name
      char        *Name;       // symbol name
      BYTE        cbPrec;      // precision information
      BYTE        cbScale;     // scale information
}SYMINFO, *PSYMINFO;
10) long SDI_EC - where SDI_EC is the SDI Error Code data structure for
      return values from functions defined in the DBGFNTBL data structure.
      Examples of the SDI_EC error codes can include:
enum SDIErrors {            // possible error codes
      SDI_OK,               // looking good
      SDI_USAGE,            // invalid parameter etc. should never happen
      SDI_VERSION,          // version mismatch; cannot proceed
      SDI_OUT_OF_MEMORY,    // out of memory
      SDI_SYM_NOTFOUND,     // invalid sym name
      SDI_INVALID_SYMTYPE,  // invalid sym type
      SDI_INVALID_SYMVAL,   // invalid sym value
      SDI_INVALID_SPID,     // invalid spid
      SDI_SHUTDOWN,         // code set during SDIDbgOff
      SDI_MAX               // last known code
};
```

Client Program Interfaces

The individual client APIs 211 and 221 of the multiple user debug system 300 include, but are not limited to, APIs for connecting and interacting with the target software 231.

Server Debug Interfaces (SDI)

The Server Debug Interfaces 232 of the multiple user debug system 300 include five interface categories including, but not limited to, an initialization API, execution control API, symbol handling API, error handling and shutdown API, and resource management API. In each of the interface categories certain of the interfaces define input buffers and output buffers. As a general rule, output buffers have small size definitions because the debugging data in the output buffers is typically short lived and it is the called process' responsibility to copy the output buffer data on a timely basis to free the output buffer for new debugging data. The data is copied over and sent to debug engines 212 and 222 for purposes that include, but are not limited to, display to user for inspection and modification. Managing the respective input buffers is the responsibility of the calling process.

Initialization API

SDIAPI BOOL SDIInit (SQLFNTBL *psqlfntbl, INTV intvsql, DBGFNTBL **ppdbgfnbl, INTV *pintvdbg)
    Return Values
        TRUE if successful, FALSE otherwise.
    Parameters
        psqlfntbl [Input] Pointer to the helper function table that is exported
        by SQL server for use by SDI.
        intvsql [Input] Version signature. LOWORD indicates the MAJOR
        server version and the HIWORD indicates the MINOR server version.
        **ppdbgfntbll [Output] Pointer to memory table allocated by SQL
        Server to be initialized by SDI and returned.
        *pintvdbg [Output] Signature of DEBUGGER version id.
Execution Control API BOOL SDINewSPID (SPID spid, char szSqlServer[cbSqlSrvrMax], char szMachine [cbMchNmMax], PID pid, PID dbgpid)
    Return Values
        TRUE if successful, FALSE otherwise.
    Parameters
        spid [Input] SQL Server Process Id for connection.
        szSqlServer[cbSqlSrvrMax] [Input] Name of SQL Server.

```
            szMachine[cbMchNmMax] [Input] Name of requesting machine
            pid [Input] Process id associated to connection. This is defined by
            the operating system.
            dbgpid [Input] Process Id of debugger. This id is registered by the
            Debugger via ODBC or DBLib.
BOOL SDINewSP (SPID spid, char *DBName, USHORT DBLen, PRID prid, NLVL
nlvl)
      Return Values
            TRUE if successful, FALSE otherwise.
      Parameters
            spid [Input] SQL Server Process ID.
            *DBName [Input] Name of Database for Stored Procedure.
            DBLen [Input] Length of Database Name.
            prid [Input] Procedure Id of SP.
            nlvl [Input] Current execution nesting level; used for callstack
            support.
BOOL SDIStep (SPID spid, PRID prid, IPX idx, OFF off, NLVL nlvl)
      Return Values
            TRUE if successful, FALSE otherwise.
      Parameters
            spid [Input] SQL Server Process ID
            prid [Input] Procedure Id. If current execution is a batch statement
            then this parameter will be NULL. And Line idx will be undefined.
            idx [Input] Line index; 0 based
            off [Input] Char offset of statement (used for batch statements). Only
            valid if prid is NULL.
            nlvl [Input] Current execution nesting level.
BOOL SDINewBatch (SPID spid, char *CmdBuf, ULONG cbCmdBuf, NLVL nlvl)
      Return Values
            TRUE if successful, FALSE otherwise.
      Parameters
            spid [Input] SQL Server Process ID.
            *CmdBuf [Input] pointer to Batch command/statement.
            cbCmdBuf [Input] size of statement in bytes.
            nlvl [Input] Current Execution nesting level.
BOOL SDIPop (SPID spid, NLVL nlvl)
      Return Values
            TRUE successful, FALSE otherwise.
      Parameters
            spid [Input] SQL Server Process Id.
            nlvl [Input] Current execution nesting level.
BOOL SDICloseConnection (SPID spid, ULONG sqlerror, SDI_EC sdierror)
      Return Values
            TRUE if successful, FALSE otherwise.
      Parameters
            spid [Input] SQL Server Process id.
            sqlerror [Input] Errors associated with the connection. Like return
            code.
            sdierror [Input] SDI errors associated to the connection. Like a
            return code.
BOOL SDISpidContext (SPID spid, PID pid, THID thid)
      Return Value
            TRUE if successful, FALSE otherwise.
      Parameters
            spid [Input] SQL Server Process ID.
            pid [Input] Debuggee process ID.
            thid [Input] Debuggee current thread id.
Symbol Handling API BOOL SDIGetSym (SPID spid, SYMS syms, PSYMINFO *prgsyminfo, USHORT
*pcsym)
      Return Values
            TRUE if successful, FALSE otherwise.
      Parameters
            spid [Input] SQL Server Process ID that we would like information
            on.
            syms [Input] enumerate defining the class of symbols to retrieve
            information on.
            *prgsyminfo [Input] Pointer to an array of symbols to retrieve.
            *pcsym [Input] Pointer to a count of symbols.
BOOL SDISetSym (SPID spid, SYMS syms, PSYMINFO psyminfo)
      Return Values
            TRUE if successful, FALSE otherwise.
      Parameters
            spid [Input] SQL Server Process ID.
            syms [Input] Enumerate Symbol class.
            psyminfo [Input] Pointer to symbol information to set values from.
Error Handling and Shutdown API BOOL SDIDbgOff (SPID spid)
```

-continued

```
    Return Value
        TRUE if successful, FALSE otherwise.
    Parameters
        spid [Input] SQL Server process ID.
SDI_EC SDIGetLastError (void)
    Return Values
        SDI_OK                      Success
        SDI_USAGE                   Invalid parameter
        SDI_VERSION                 Version mismatch
        SDI_OUT_OF_MEMORY           Out of memory to complete
                                    request
        SDI_SYM_NOTFOUND            Symbol requested could not be
                                    found (by name)
        SDI_INVALID_SYMTYPE         Symbol type requested invalid.
        SDI_INVALID_SYMVAL          Value for symbol invalid
        SDI_INVALID_SPID            SQL Server process ID invalid or
                                    unknown
        SDI_SHUTDOWN                Code set during SDIDbgOff
    Remarks
        SDIGetLastError is exported by SQL Server and called by the SQL
        Debugger (SDI) to retrieve information on the last known failure
        return code.
Resource Management API void *SDIPvAlloc (size_t cb);
    Return Value
        Pointer to memory if successful, otherwise NULL.
    Parameters
        cb [Output] Number of bytes to allocate.
    Remarks
        SDIPvAlloc is exported by the SQL Debugger (SDI) for use by SQL
        Server to isolate resources consumed for debugging by SQL Server.
        It is assumed that the SQL Debugger (SDI) will maintain and manage
        its own heap, separate from SQL Server. All memory allocation
        required for symbol and other information will be retrieved via this
        API. Memory allocated via this function should be freed via
        SDIFreePv( )
void *SDIPvAllocZ (size_t cb)
    Return Value
        32 bit pointer to memory if successful, NULL otherwise.
    Parameters
        cb [Input] Number of bytes to allocate.
    Remarks
        SDIPvAllocZ is exported by SQL Debugger (SDI) for use by SQL
        Server, memory block allocated will be zero filled at allocation time
        (synonymous with calloc). Memory allocated via this function should
        be freed via SDIFreePv( ).
void *SDIPvRealloc (void *pv, size_t cb)
    Return Value
        32 bit pointer to memory if successful, NULL otherwise.
    Parameters
        pv [Input] pointer to memory block to realloc.
        cb [Output] New size of buffer in bytes.
    Remarks
        SDIPvRealloc is expotted by SQL Debugger (SDI) for use by SQL
        server and has the same semantics as CRT function realloc. Memory
        allocated via this function should be freed via SDIFreePv( ).
void SDIFreePv (void *pv);
    Parameters
        *pv [input] Pointer to memory block to free.
    Remarks
        SDIFreePv is exported by SQL Debugger (SDI) for use by SQL
        Server to free memory allocated by SDIPvAlloc, SDIPvAllocZ, and
        SDIPvRealloc.
```

Debugging System Initialization - FIG. 4

FIG. 4 illustrates the debugging system initialization steps 400 in flow diagram form. The debugging interface definition steps 400 begin at step 402 and disclose the details of step 314 from FIG. 3. At step 407, the debug engine for a given client, for example debug engine 212 for client 210, calls a private interface in target software interface 211 to pass a pointer to a data structure that contains information needed to start the debug system initialization process including, but not limited to, a client machine name, a client Process Identification (PID), a debugger PID, and debugger specific information. An example of a call that would be issued by a client to initialize a server debugging session is sp_sdidebug ('on', '<client machine name>', <client PID>, <debugger PID>, <debugger specific info>).

At step 418, the sp_sdidebug 'on' call invokes the initialization Server Debugging Interface API SDIInit( ) after loading the Server Debug Interface (SDI) DLLs. The SDIInit( ) API performs initialization tasks including, but not limited to, API version checking, and exchanging function tables between client and server to facilitate event notification for events occurring during execution of the target software.

Once the debugging system is enabled at step 425, for client 210 in the present discussion, the client's thread context is passed to the target software 231 using the CONTEXT parameter of the stored procedure sp_sdidebug. A thread is an interprocess communications technique that is well known in the distributed computing art. More generally, a thread is a communications channel or communications means between two processes such as between a client process and a server process in a distributed computing environment, and multiple threads can be established between the same client process and server process. In a preferred embodiment of the present invention, a single thread is used for each connection between a client process and a server process in the interest of simplicity and subject to the availability of operating system resources to support the potentially large number of threads. An example of a call to invoke passing the thread context information, including a Thread IDentification (TID) from the client to the server, is sp_sdidebug ('context', <client PID>, <client TID>).

Once the thread context is established at step 425, the initialization is complete at step 431 and processing returns to the process flow disclosed in FIG. 3.

Figure 5:
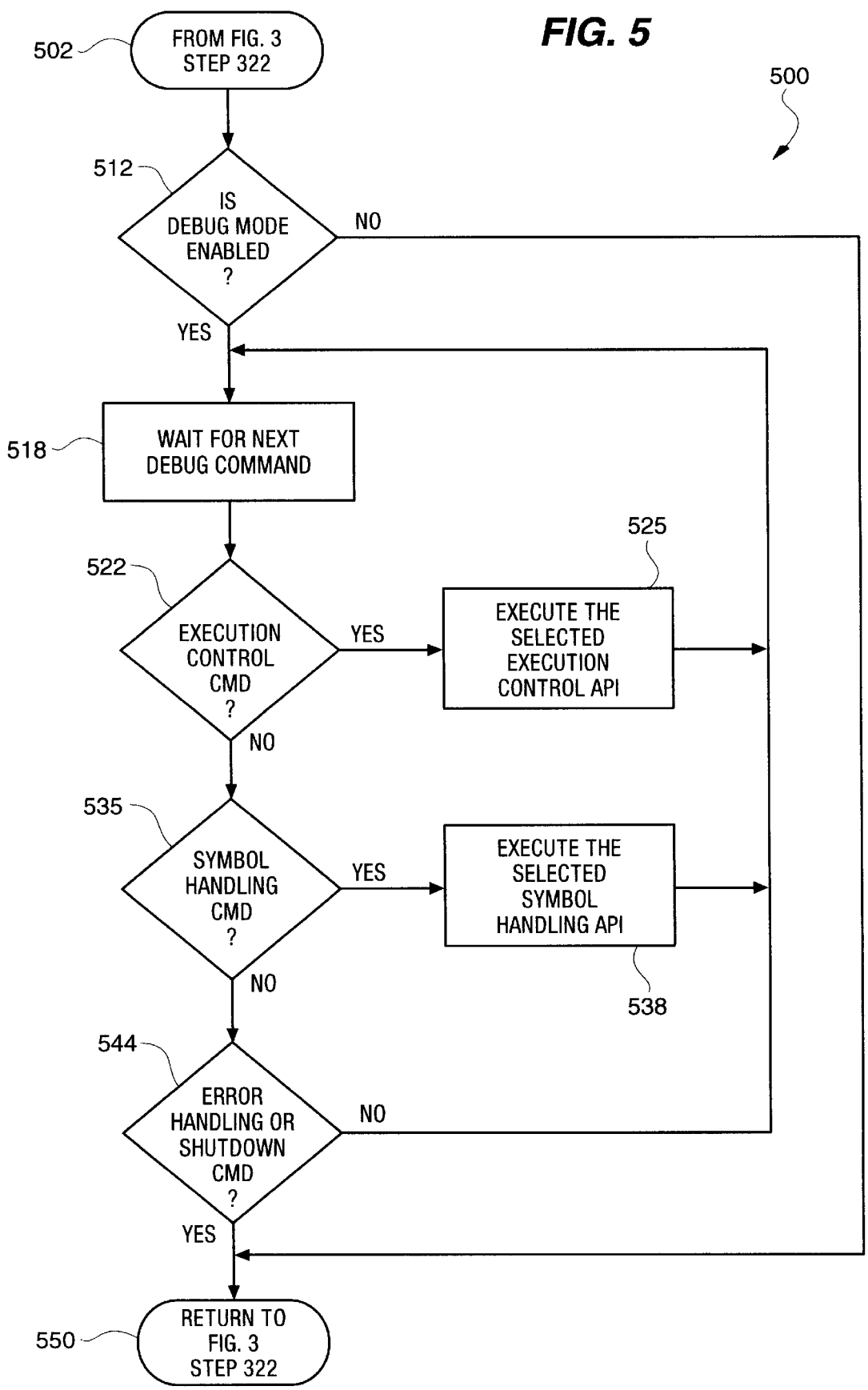
FIG. 5 illustrates active debugging operational steps flow diagram form.

Debug Processing - FIG. 5

FIG. 5 illustrates the operational debug processing steps 500 that occur following initialization of the multiple user debug debugging system of the present invention. The processing steps 500 begin at step 502 and represent the details of overview step 322 of FIG. 3.

If at decision step 512 the debug mode of the debugging system is not enabled, then processing continues to step 550 where the operational debug processing steps 500 return to the next step following overview step 322 of FIG. 3. If it is determined at decision step 512 that the debug mode for the debugging system is enabled, then processing continues at step 518 where the debugging system waits for a debug command from either the client's debugger such as debug engine 212, or from the target software 231 itself.

If at decision step 522 the debug command is a target software execution control API, then processing continues to execute the present execution control API at step 525 prior to returning to wait for a next debug command at step 518. An execution control API is called by the target software 231 from a selection of execution control API's including, but not limited to, SDINewSPID, SDINewSP, SDIStep, SDINewBatch, SDIPop, SDICloseConnection, and SDISpidContext.

The SDINewSPID API is called by the target software 231 whenever a request for a client debugging connection is made. The API passes a Connection Id, the name of the target software server, the client machine name, the client PID, the debug engine PID, and additional debugger specific information. A new PID is established for the resulting target software server connection.

The SDINewSP API is called by the target software 231 prior to executing a Stored Procedure (SP) on behalf of a client connection that has debug mode enabled.

The SDIStep API is called by the target software 231 prior to executing a target software program step or stored procedure step on behalf of a client connection that has debug mode enabled. This API allows the client debugger time to access information specific to this thread of execution on a step by step program execution basis including, but not limited to, symbol information for local variables, procedure parameters, and global variables.

The SDINewBatch API is called by the target software 231 prior to executing multiple target software program steps on behalf of a client connection that has debug mode enabled. This API allows the client debugger time to access information specific to this thread of execution including, but not limited to, symbol information for local variables, procedure parameters, and global variables.

The SDIPop API is called by the target software 231 when a current target software programming nest level is exited. This API facilitates the building of runtime callstacks during program execution and profiling.

The SDICloseConnection API is called by the target software 231 prior to disconnecting a client thread connection. System cleanup of connection resources also takes place up on executing this API for resources that include, but are not limited to, memory garbage collection.

The SDISpidContext API is called by the target software 231 in response to a request by the Debug engine to set the current context of a thread connection. Information provided by this API is useful for client debuggers to track and associate connection information with information that the debugger has in its native form. The client debuggers 212 and 222 can associate a specific thread of execution in 211 or 221 with the connection being debugged.

If at decision step 522 the debug command is not a target software execution control command, then processing continues to decision step 535. If at decision step 535 the debug command is a symbol handling command, then processing continues to execute the present symbol handling API at step 538 prior to returning to wait for a next debug command at step 518. A symbol handling API is called by any one of the client debug engines from a selection of symbol handling API's including, but not limited to, SDIGetSym, and SDISetSym.

The SDIGetSym API is called by a client debug engine to request information about a class of symbols during a pause in processing resulting from either SDIStep or SDIBatch as disclosed above. The symbol information can be retrieved individually or as a batch fetch. The symbol classes are defined in an SDI header file in a form, for example, as in the following enumerate:

typedef enum {symGlobals, symLocals, symParams}SYMS;

Symbols are typically in classes including, but not limited to, global variables, parameters to stored procedures, and local variables. However, retrieving information about local variables and parameters are different from retrieving global variables. In the case of locals and parameters, the debugger engine requests the information and the target software defines the amount of information involved and allocates resources necessary to buffer the information. In the preferred embodiment, the buffers are under the control of and freed by the debugger and not the target software. Memory for the buffers are allocated out of a resource API that is exported by the debugger engine.

Global symbol information is gathered individually and not by batch. The Server Debugger Interface 232 defines the names of the global symbols that are being requested, and allocates the memory to buffer the information.

The SDISetSym API is called by the Server Debug Interface (SDI) 232 to set the value of local variables and parameters. Setting of global variables is not permitted in the case of SQL Server but may be possible in other scenarios.

Example Debug Session

Consider the case where a user wishes to debug a stored procedure or an application that connects to target software and executes a stored procedure. The user sets a breakpoint in the stored procedure and starts debugging in a manner similar to traditional single user debugging a single target software system. When the new connection is made to target software 231, the target software loads SDI 232 and calls methods SDIInit and SDINewSPID. Before the stored procedure is executed by the target software 231, the target software notifies the SDI 232 about the stored procedure and the statement to be executed by calling SDINewSP and SDIStep. This information is relayed to the debug engine on the client machine which displays to the user the line of program code about to be executed. The user is free to view any locals of parameters at this time. This is accomplished by using the callback interface SDIGetSym. The thread in the target software 231 is in the meantime suspended until the user wishes to continue. Before continuing the user has a chance to modify symbolic information. In this case the callback function SDIGetSym is used to make the changes. When the user resumes execution the Server Debug Interface releases the suspended target software thread to continue execution. Connections from other client machines continue execution in target software 231 normally as they run on different threads. When the connection is closed the target software calls SDICloseConnection to notify the Server Debug Interface. A user stops debugging as one would do in a single user debugging system.

Figure 6:
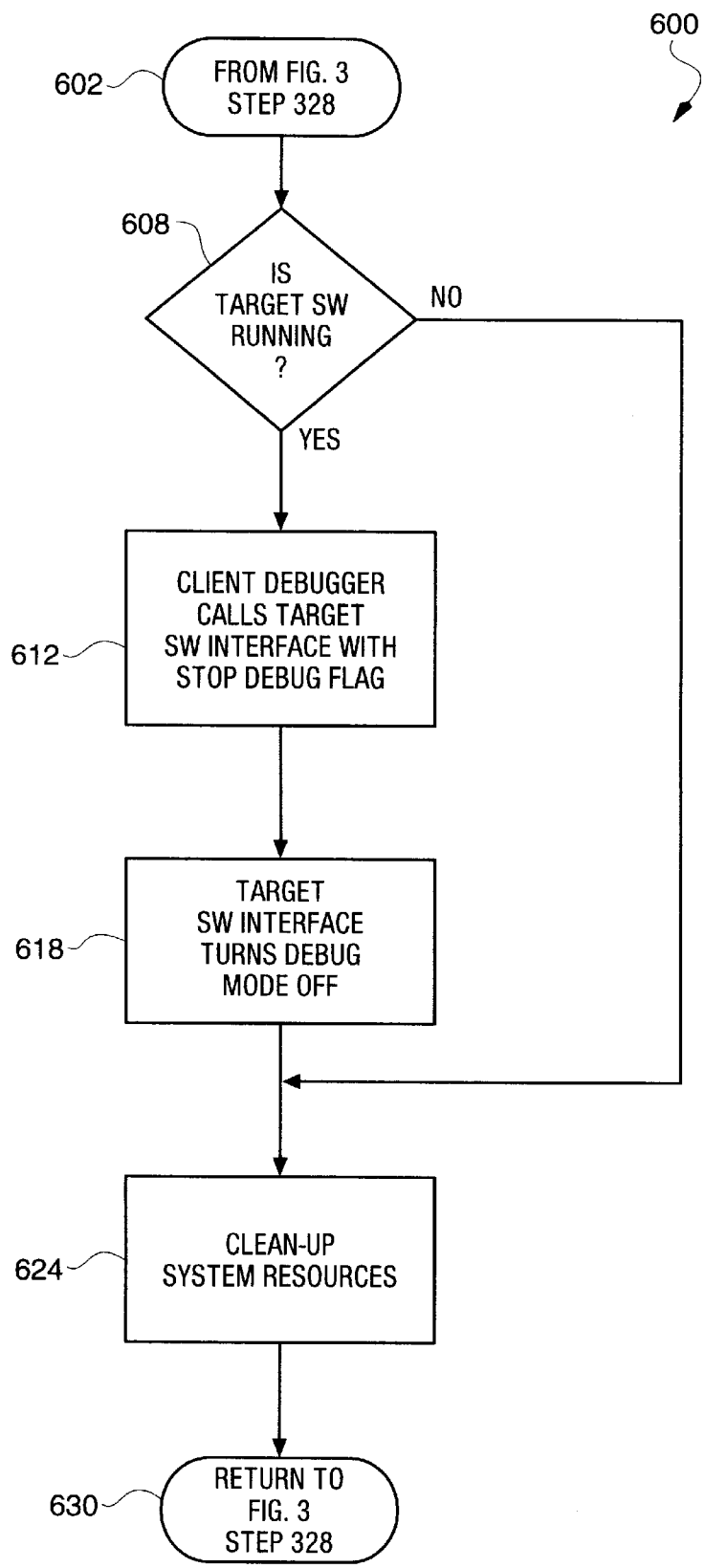
FIG. 6 illustrates debugging system termination steps in flow diagram form.

Debugging System Termination - FIG. 6

FIG. 6 illustrates the error handling and termination steps 600 for the multiple user debugging system of the present invention. The termination steps 600 begin at step 602 and represent the details of overview step 328 of FIG. 3.

If it is determined at decision step 608 that the target software 231 is not running, then processing continues at step 624 where system resources consumed during debugging are released and termination processing ends at step 630. Alternatively, if at decision step 608 the target software 231 is running, then processing continues at step 612.

At step 612 the client debugger 212 initiates a private interface call to its target software interface 211 to request that debugging be terminated. In response to the action of step 612, the target software interface 211 executes the sp_sdidebug ('off') to turn the debug mode off. At step 624, system resources consumed during debugging are released and the termination processing ends at step 630.

Summary

The debugging system of the present invention includes a method and apparatus for a multiple user software debugging system having a minimally intrusive debugging environment for a non-compiled scripted software target in a client and server computing environment where execution control of the target software exists by the debugging system participating as part of the actual target software system activity without disrupting concurrent debugging activity by the multiple users of the target software. Although specific embodiments are disclosed herein, it is expected that persons skilled in the art can and will design alternative multiple user debugging systems that are within the scope of the following claims either literally or under the Doctrine of Equivalents.

What is claimed is:

1. A computer readable medium containing computer executable instructions to perform a method for debugging a target software that is common to multiple users wherein each of said multiple users are independently operating a debug engine in a multiple user software debugging environment, said method comprising:

integrating at least one of a plurality of debug interface calls into said target software;

loading a debug interface library containing a plurality of debug interfaces into said computer readable medium for use by said target software and said debug engine, and at least one of said plurality of debug interfaces is loaded as an operational component of said target software; and concurrently executing said target software under minimally intrusive control of said debug engine by said debug interface of each of said multiple users.

2. A method according to claim 1 wherein said target software is a non-compiled interpreted script-type computer program.

3. A method according to claim 1 wherein said step of loading includes:

establishing at least one thread connection for each one of said multiple users to communicate between said target software and said debug engine for each one of said multiple users.

4. A method according to claim 1 wherein said step of concurrently executing includes:

calling at least one of said plurality of debug interfaces from said target software for each executable target software statement to notify said debug engine of a target software event; and retrieving internal target software operating information by said debug engine in response to a user input command.

5. A method according to claim 1 including:

defining said debug interface library to contain at least one interface selected from a group consisting of: an initialization interface, an execution interface, a symbol handling interface, an error handling and termination interface, and a resource management interface.

6. A method according to claim 1 including:

terminating said debug environment in response to a request by said debug engine and in response to said target software failing to execute.

7. A computer-readable storage device containing instructions for controlling a computer system to perform steps according to claim 1.

8. A multiple user software debugging system comprising:

a target software program and a server debug interface resident on a common server computing device, said target software program being is a non-compiled interpreted script-type computer program;

a debug engine and a target software program interface on each of a plurality of client computing devices;

a debug interface library including at least one debug interface call and at least one callback function selected from a group of interfaces consisting of: an initialization interface, an execution interface, a symbol handling interface, an error handling and termination interface, and a resource management interface;

at least one debug interface call integrated into said target software program;

means for loading said debug interface library into each requesting one of said plurality of client computing devices and one of said at least one debug interface call as an operational component of said target software program;

means for establishing at least one operative communication link for each of said plurality of client computing devices to communicate bidirectionally between said target software program and said debug engine of each of said plurality of client computing devices; and means for concurrently executing said target software program under minimally intrusive control of said debug engine of each of said client computing devices as an independent uninterrupted session for each of said client computing devices by way of said target software program interface that is unique to each of said client computing devices.

9. A system according to claim 8 wherein said means for concurrently executing includes:

means for notifying said debug engine of one of said plurality of client computing devices, of a target software program event corresponding to said independent uninterrupted session of one of said plurality of client computing devices; and retrieving internal target software program operating information by said debug engine of said independent uninterrupted session of one of said plurality of client computing devices in response to a user input command from a user of said one of said plurality of client computing devices.

10. A system according to claim 9 including:

means for determining a failure of said target software program to execute; and means for controllably terminating said system in response to a request by said debug engine of said independent uninterrupted session of one of said plurality of client computing devices in response to said target software program failure.

11. A method comprising:

establishing at least one thread connection between a common target software program on a server computing device and a target software program interface on each of a plurality of client computing devices, said target software program being an interpreted script program;

concurrently executing an independent debug session on each of said plurality of client computing devices by way of a debug engine and target software program interface on each of said plurality of client computing devices; and individually manipulating said target software program by said debug engine on each of said plurality of client computing devices using at least one execution control command and at least one symbol handling control command.

12. A method according to claim 11 including:

defining a software debug interface library supporting said at least one execution control command and said at least one symbol handling control command from at least one of a group of interfaces comprised of: an initialization interface, an execution interface, a symbol handling interface, and error handling and termination interface, and a resource management interface.

13. A method according to claim 12 including:

loading said software debug interface library into a local memory for user by said target software program and said debug engine of each of said plurality of client computing systems.

14. A method according to claim 13 including:

integrating at least one of said group of interfaces into said target software program;

calling one of said group of interfaces by said target software program to notify said independent debug session on one of said plurality of client computing devices of a target software program event; and retrieving operational information internal to said target software program by said debug program of one of said plurality of client computing devices.

15. A computer-readable storage device containing instructions for controlling a computer system to perform steps according to claim 14.

16. A multiple user software debugging system comprising:

a target software program and a server debug interface resident on a common server computing device;

a debug engine and a target software program interface on each of a plurality of client computing devices;

a debug interface library including at least one debug interface call and at least one callback function, wherein at least one debug interface call is integrated into said target software program and said debug interface library is loadable into each requesting one of said plurality of client computing devices and one of said at least one debug interface call as an operational component of said target software program; and means for establishing at least one operative communication link for each of said plurality of client computing devices to communicate between said software program and said debug engine of each of said plurality of client computing devices so that said software target program can concurrently execute under minimally intrusive control of said debug engine of each of said client computing devices as an independent uninterrupted session for each of said client computing devices by way of said target software program interface.

17. A system according to claim 16 including:

said target software program being a non-compiled interpreted script-type computer program.

18. A system according to claim 16 including:

said debug interface library being selected from at least one of a group of interfaces consisting of: an initialization interface, an execution interface, a symbol handling interface, an error handling and termination interface, and a resource management interface.

* * * * *